US009622492B2

(12) United States Patent
Ledet et al.

(10) Patent No.: US 9,622,492 B2
(45) Date of Patent: Apr. 18, 2017

(54) SHRIMP PROCESSING SYSTEM AND METHODS

(71) Applicant: Laitram, L.L.C., Harahan, LA (US)

(72) Inventors: Charles J. Ledet, Metairie, LA (US); Robert S. Lapeyre, New Orleans, LA (US); Bruce F. Taylor, Kenner, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/304,764

(22) PCT Filed: Apr. 22, 2015

(86) PCT No.: PCT/US2015/027032
§ 371 (c)(1),
(2) Date: Oct. 17, 2016

(87) PCT Pub. No.: WO2015/164471
PCT Pub. Date: Oct. 29, 2015

(65) Prior Publication Data
US 2017/0035069 A1    Feb. 9, 2017

Related U.S. Application Data

(60) Provisional application No. 61/983,835, filed on Apr. 24, 2014.

(51) Int. Cl.
*A22C 17/00*   (2006.01)
*A22C 29/02*   (2006.01)
*A22C 29/00*   (2006.01)

(52) U.S. Cl.
CPC ........ *A22C 17/008* (2013.01); *A22C 17/0093* (2013.01); *A22C 29/005* (2013.01); *A22C 29/026* (2013.01); *A22C 29/028* (2013.01)

(58) Field of Classification Search
CPC ... A22C 17/00; A22C 17/0073; A22C 17/008; A22C 29/00; A22C 29/02
(Continued)

(56) References Cited

U.S. PATENT DOCUMENTS 2,964,181 A   12/1960   Demarest et al.
4,079,416 A    3/1978   Faani et al.
(Continued)

FOREIGN PATENT DOCUMENTS

JP   040558373 A   2/1992
WO   03013745 A1   2/2003

OTHER PUBLICATIONS

Murat O. Balaban, Sencer Yeralan, Ymir Bergmann, "Determination of Count and Unifomity Ratio of Shrimp by Machine Vision," Journal of Aquatic Food Product Technology, vol. 3(3) 1994, pp. 43-58, The Haworth Press, Inc.
(Continued)

*Primary Examiner* — Richard Price, Jr.
(74) *Attorney, Agent, or Firm* — James T. Cronvich (57) ABSTRACT

Methods and systems using a vision system to process shrimp. The in-line or off-line vision system captures images of samples of shrimps. The processor produces a digital image of the shrimps in the samples. Shrimps exiting a peeler are imaged to determine the number of tail segments in or the percentage of full weight of each. The shrimps are classified by the number of intact segments, and quality, yield, and throughput computed from the classification results. The processor can control operational settings of the peeler based on the classification results. In a larger system including other shrimp-processing equipment besides the peeler, other points along the processing path can be imaged
(Continued)

by camera or sensed by other sensors to determine processing quality and to make automatic operational adjustments to the equipment.

25 Claims, 6 Drawing Sheets

(58) Field of Classification Search
USPC .................................................. 452/1–5
See application file for complete search history.

(56) References Cited

U.S. PATENT DOCUMENTS

| | | |
|---|---|---|
| 4,790,439 A | 12/1988 | McIntyre et al. |
| 4,818,380 A | 4/1989 | Azegami et al. |
| 4,819,176 A | 4/1989 | Ahmed |
| 4,847,954 A | 7/1989 | Lapeyre et al. |
| 4,934,028 A | 6/1990 | Stipe |
| 4,963,035 A | 10/1990 | McCarthy et al. |
| 5,020,675 A | 6/1991 | Cowlin |
| 5,064,400 A | 11/1991 | Stipe |
| 5,165,219 A | 11/1992 | Sekiguchi |
| 5,184,732 A | 2/1993 | Ditchburn |
| 5,195,921 A | 3/1993 | Ledet |
| 5,229,840 A | 7/1993 | Arnarson et al. |
| 5,246,118 A | 9/1993 | Mosher |
| 5,346,424 A * | 9/1994 | Chiu .................. A22C 29/026 452/184 |
| 5,352,153 A | 10/1994 | Burch et al. |
| 5,839,952 A * | 11/1998 | Pollingue ............. A22C 29/023 452/2 |
| 6,200,209 B1 | 3/2001 | Shelton |
| 6,808,448 B1 | 10/2004 | Kanaya et al. |
| 8,177,609 B2 * | 5/2012 | Andersen ............. A22C 29/028 452/1 |
| 8,189,901 B2 | 5/2012 | Modiano |
| 2012/0085686 A1 | 4/2012 | Radema |
| 2014/0168411 A1 | 6/2014 | Ledet et al. |

OTHER PUBLICATIONS

"USDC/NOAA/Seafood Inspection Program, United States Standards for Grades of Fresh and Frozen Shrimp," Jan. 14, 2009, XP055109806, retrieved from the Internet: URL: http://www.seafood.nmfs.noaa.gov/ShrimpFreshandFrozen.pdf [retrieved on Mar. 25, 2014] p. 4, paragraph iii (a).
Pan et al., "Prediction of shelled shrimp weight by machine vision," Journal of Zheijiang University Science B, 2009 10(8): 589-594.
First Office Action U.S. Appl. No. 14/086,659, May 9, 2016.
Final Office Action U.S. Appl. No. 14/086,659, Nov. 3, 2016.

* cited by examiner

SHRIMP PROCESSING SYSTEM AND METHODS

BACKGROUND

The invention relates to apparatus and methods for processing shrimp.

Originally introduced because of the high labor costs associated with peeling small shrimp by hand, shrimp-peeling machines are now widely used in the shrimp processing industry. Roller-type shrimp-peeling machines, in particular, dominate the bulk peeling industry. U.S. Pat. Nos. 2,778,055 and 2,537,355, both to Fernand S., James M., and Emile M. Lapeyre, describe the basic structure and principles of operation of roller-type shrimp peelers.

Many factors affect the throughput, quality, and yield of peeled shrimp. Some factors related to the shrimp themselves include the species, size, uniformity, and freshness of the shrimp. Factors related to the peeling equipment, include the feed rate of shrimp to the peeler, water flow to the peeler, and finger-frame pressure. Other factors relate to other shrimp-processing equipment, such as cleaners, shrimp feed systems, roller separators, air separators, and graders. The equipment-related factors are generally manually adjustable to improve peeling quality and yield for a given batch of shrimp or to compensate for peeling-roller wear. Because the quality and yield of the peeled shrimp directly affect their production cost and the price they can command, proper adjustment of the peeling equipment is important. But proper manual adjustment requires diligent monitoring of the output quality and yield and experience in selecting the adjustments that should be made.

SUMMARY

A shrimp-processing system embodying features of the invention comprises a conveyor conveying shrimps along a processing line and an off-line QC station with a vision system that captures digital images of sample shrimps collected from the shrimps on the conveyor. A processor determines the number of tail segments present in each of the sample shrimps or estimates the percentage of full weight of each of the sample shrimps from the digital image and classifies each of the sample shrimps into one of a plurality of classes according to the number of tail segments present in or the percentage of full weight of each of the sample shrimps.

In another aspect of the invention, an off-line QC station for a shrimp-processing system comprises a vision system capturing a digital image of sample shrimps collected from the shrimps on the conveyor and a processor that determines the number of tail segments present in each of the sample shrimps or estimates the percentage of full weight of each of the sample shrimps from the digital image and classifies each of the sample shrimps into one of a plurality of classes according to the number of tail segments present in or the percentage of full weight of each of the sample shrimps.

In yet another aspect a method embodying features of the invention for processing shrimps comprises: (a) transporting shrimps on a conveyor in a conveying direction on a processing line; (b) collecting sample shrimps from the shrimps being transported on the conveyor; (c) creating a digital image of the shrimps in an off-line vision station; (d) determining the number of tail segments in or the percentage of full weight of each of the sample shrimps from the digital image; and (e) classifying each of the sample shrimps into one of a plurality of classes according to the number of tail segments present in or the percentage of full weight of each of the shrimps.

BRIEF DESCRIPTION OF THE DRAWINGS

These features and aspects of the invention are described in more detail in the following description, appended claims, and accompanying drawings, in which:

DETAILED DESCRIPTION

Figure 1:
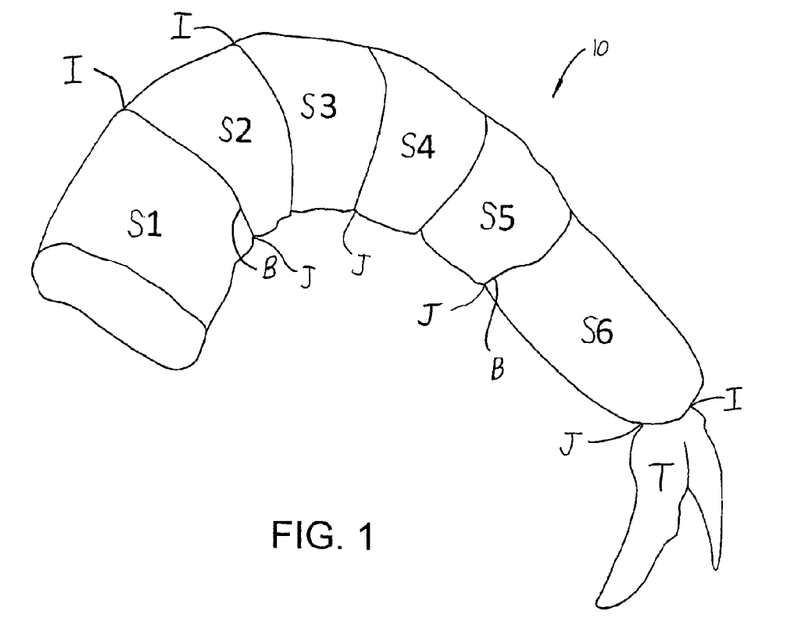
FIG. 1 is a pictorial view of a peeled shrimp.

FIG. 1 shows the anatomy of a peeled, or shelled and deheaded, shrimp. The complete shrimp meat 10 includes six main segments S1-S6 and a telson T. The head-end segment S1 has the largest girth of all the segments; the tail-end telson T is sometimes lost along with the shell in the peeling process. The segments S1-S6 are typically referred to as "tail segments." Borders B between adjacent tail segments are generally discernable, as are other features, such as indentations I along the back and indentations J along the underside at the junctions of the adjacent tail segments.

Figure 2A:
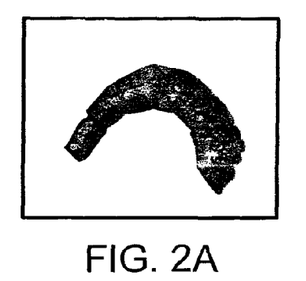
FIGS. 2A-2C are side views of high quality, medium quality, and low quality peeled shrimps.
Figure 2B:
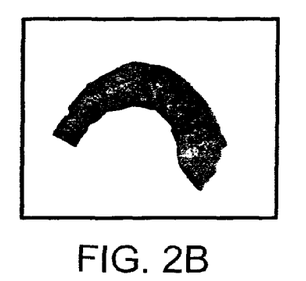
Figure 2C:
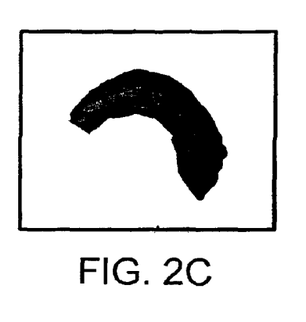
Figure 2D:
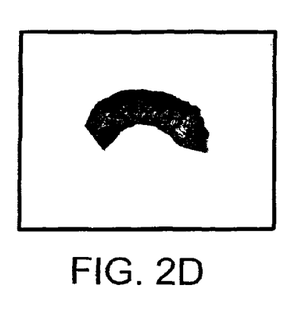
FIG. 2D is a side view of a shrimp bit.

One way to determine the quality of the peel is by counting the number of contiguous tail segments of the peeled shrimps exiting a peeler and classifying each peeled shrimp as High Quality, Medium Quality, or Low Quality. For example, each shrimp having six full tail segments S1-S6 (with or without all of its telson) could be classified as High Quality (FIG. 2A); each shrimp not of High Quality and having complete tail segments S1-S5 plus more than half of tail segment S6 (FIG. 2B) could be classified as Medium Quality; and every shrimp not of High or Medium Quality and having complete tail segments S1-S5 could be classified as Low Quality (FIG. 2C). Shrimps having fewer tail segments than the Low Quality shrimp could be classified along with shrimps missing the first tail segment S1 as Bits. Of course, the quality levels, or classes, may be defined in other ways. For example, the Medium Quality class could include all shrimp not of High Quality and having five full tail segments (S1-S5); the Low Quality class could include all shrimps not of High or Medium Quality and having four full tail segments (S1-S4); and any other shrimp meats could be classified as bits. Alternatively, more than four quality levels could be defined.

Figure 3:
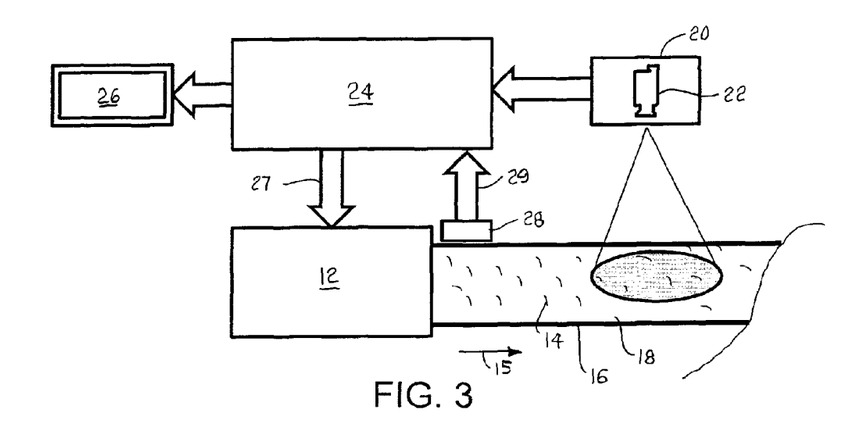
FIG. 3 is a block diagram of a portion of an automated shrimp-peeling system embodying features of the invention.

An automated peeling system embodying features of the invention is shown in FIG. 3. A shrimp peeling machine, or peeler, 12 removes the heads and shells from shrimps. One example of such a peeler is the Model A peeler manufactured and sold by Laitram Machinery, Inc. of Harahan, La., U.S.A. The general structural details and operation of a roller-type peeler like the Model A is described in U.S. Pat. No. 2,778,055, which is incorporated by reference into this description. Shrimp meats 14 are transported out of the peeler 12 in a conveying direction 15 along a processing line to further processing stations downstream on a conveyor 16, such as a conveyor belt having an outer conveying surface 18, which supports the shrimp. Alternatively, the shrimps could be conveyed from the peeler in a flume or could fall after exiting the peeler.

A vision system 20 including one or more cameras 22 captures a frame image of the shrimps on a portion of the conveyor, as they pass by in a flume, or as they pass the vision system in free fall. The vision system 20 produces digital images of the shrimps 14 on the conveying surface 18. The shrimps generally rest side-down on the conveying surface 18, which may be a darker surface than the shrimp meat to provide contrast for better imaging. The digital image of the frame is sent to a processor 24, which processes the image. Imaging algorithms detect physical characteristics, or features, of the shrimp, such as, for example, outer upper and lower edges showing the indentations (I, J; FIG. 1) and more heavily pigmented lines of high contrast in the shrimp meat indicating boundaries (B; FIG. 1) between tail segments. As an alternative to discerning the tail segments from boundaries or indentations, imaging algorithms using a shrimp's projected area, its perimeter, its arc length, or relationships between various dimensions, such as the ratio of the width of the shrimp (upper edge to lower edge) at the head end in the first tail segment S1 to the width of the last intact tail segment, could be used to determine the quality class. Or a pattern-recognition algorithm that compares each imaged shrimp to standard digital models of shrimps of various numbers of tail segments could be used. A library of standard digital images of various species of shrimp could be maintained. From the processed image, the algorithms determine the number of contiguous intact tail segments for each shrimp image in the frame and classify each shrimp into one of the quality classes. The algorithms also count the total sample of shrimps and the number of shrimps in each quality class for each frame. From the counts, the algorithms compute peeling quality and yield statistics, such as the yield of each quality class, which can be reported on a display monitor 26, printed as a report, or sound an alarm if the statistics lie outside preset limits. The processor 24 can also adjust one or more operating parameters of the peeler, such as infeed rate, roller rotation frequency, finger-frame pressure, and water flow, in response to out-of-limits yield or quality values by control signals over control lines 27.

Figure 6:
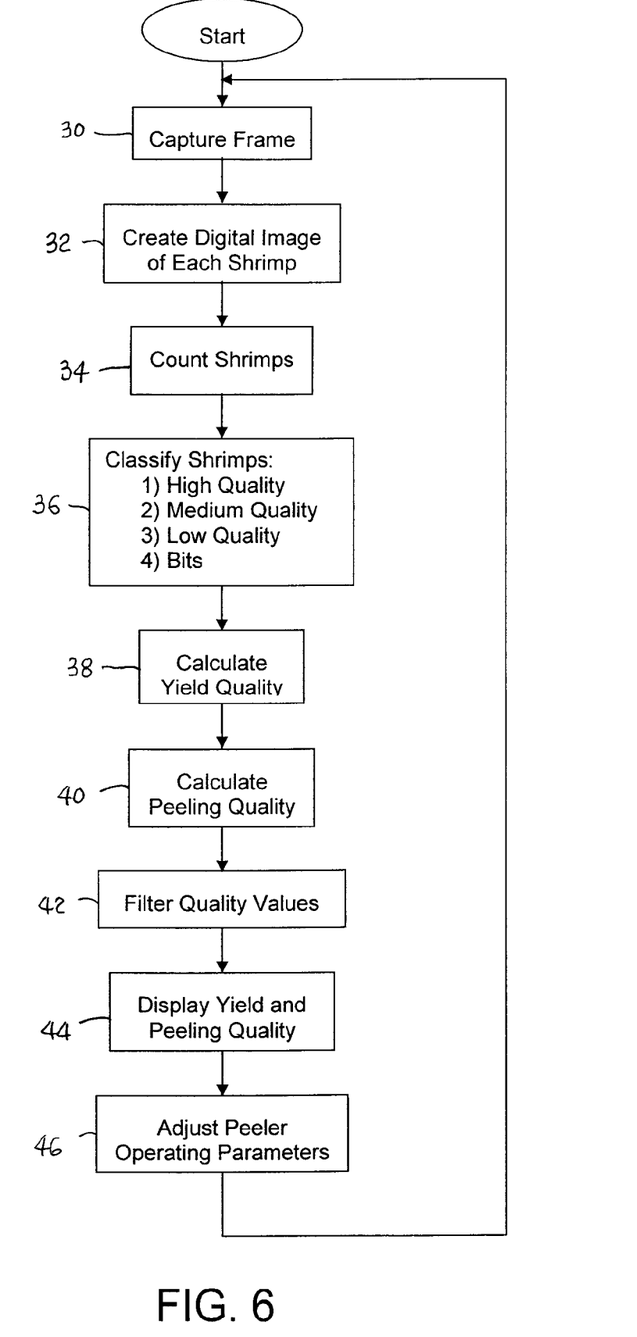
FIG. 6 is a flowchart of one version of a control scheme usable in an automated shrimp-peeling system as in FIG. 3.

One exemplary version of a control scheme usable with the system of FIG. 3 is shown in the flowchart of FIG. 6. First, the vision system captures a frame 30 of a sample of the peeled shrimps after they exit the peeler. A digital image of each shrimp in the sample is then created from the frame 32 and processed in one of the ways previously described. The shrimps in the frame are counted 34 to give the sample size. From the digital image of each shrimp, the number of contiguous, intact tail segments of each shrimp is determined by a tail-segment-counting algorithm, and the shrimps are classified 36 into quality levels, e.g., high, medium, and low, depending on the number of intact tail segments. The classification process also classifies shrimps having fewer intact tail segments than the threshold for low-quality shrimp or shrimp portions missing the first segment S1 as bits, which are usually not large enough to be sold as peeled shrimp. Shrimps that include pieces of shell may also be counted. The relatively greater reflectivity of shell versus that of shrimp meat can be used in the image processing to detect incompletely peeled shrimps with residual shell. The yield in each quality class, i.e., the quality yield, is computed 38 as: Bits %=bits count/sample size; Low Quality %=Low Quality count/sample size; Medium Quality %=Medium Quality count/sample size; and High Quality %=High Quality count/sample size. These percentage values provide a measure of yield based on count, which does not require measuring or estimating the weight of the shrimp. The peeling quality is calculated 40 as: Peeling Quality %=1−(shell-on count/sample size). To smooth the computed values from frame to frame, the computed values or the individual counts can be filtered 42 in a moving-average digital filter, for example. Then the filtered values can be displayed 44 or otherwise reported. The filtered quality values can also be used by the processor to automatically adjust operating parameters 46 of the peeler. The process is then repeated for another frame.

The process described with respect to the flowchart of FIG. 6 computes quality classes and yield values based on relative counts of shrimps in the various quality levels, categories, or classes that are defined by the number of contiguous intact tail segments. Another way yield can be measured is by converting the tail-segment count into a shrimp weight. The relationship between the percent cumulative weights of peeled shrimp meat from the head-end segment S1 through the telson T has been empirically determined for three particular groups of shrimp in FIG. 4. The three graphed curves are for wild, cold-water Pandalus Borealis and for Vannamei farm-raised in Honduras and Peru. For Pandalus Borealis, the first segment represents just under 30% of the weight of a complete peeled shrimp, the first and second segments together represent about 45%, and the first through sixth segments represent about 98% of the shrimp by weight. Using the tail-segment-counting algorithm to determine the number of intact tail segments, including fractions of the final incomplete segment, the processor can use the predetermined curve for the kind of shrimp being peeled to assign a percentage-of-full-weight estimate to each piece of shrimp meat. Then the percentages of all the shrimps in the frame can be averaged to obtain a weight-based yield percentage for each frame, which could be filtered in the same way as the yield values in FIG. 6.

Figure 7:
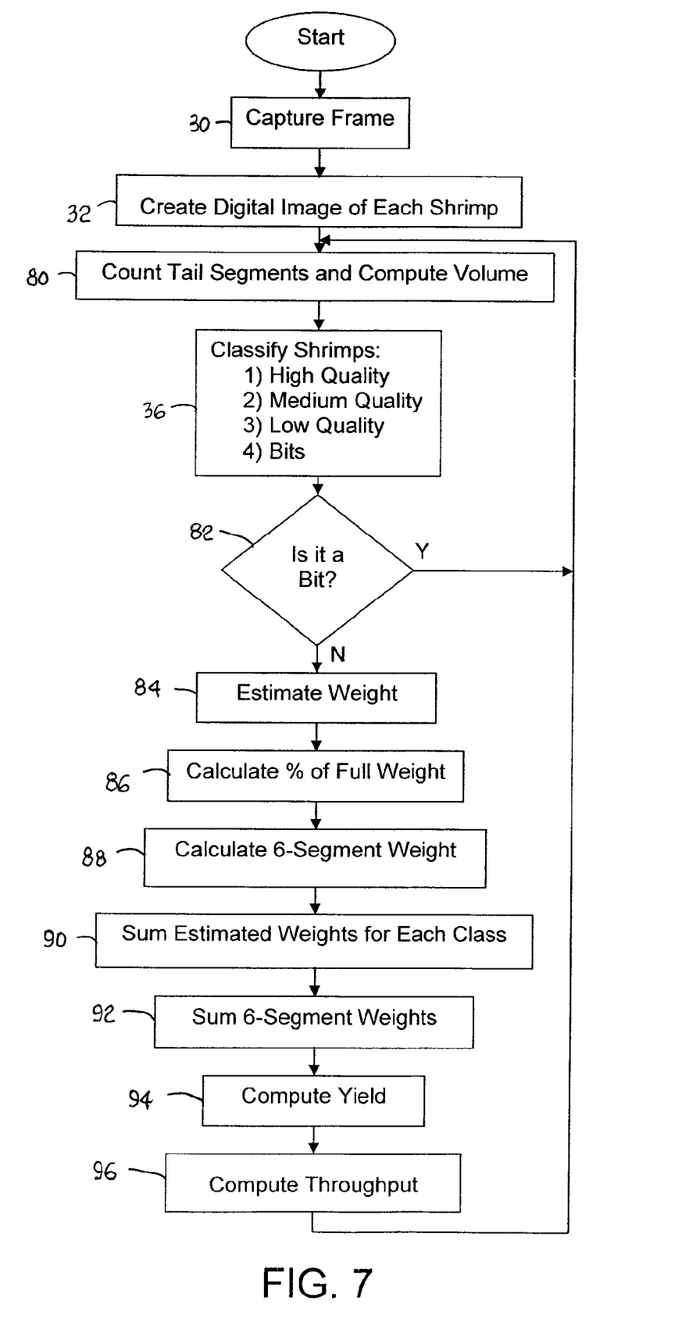
FIG. 7 is a flowchart of one version of a weight-based algorithm for estimating yield and throughput in a shrimp-peeling system as in FIG. 3.

Other vision-system algorithms can alternatively be used to determine each shrimp's volume. In a one-camera, two-dimensional image capture, the shrimp's projected area, its perimeter, its arc length, or other dimensional attributes, which may be used to determine the segment count, could also be used to estimate the shrimp's volume. With knowledge of the meat density (weight/volume) of the species of shrimp being measured, the weight of each shrimp piece is determined by multiplying the volume by the density. An exemplary weight-based algorithm for calculating yield and throughput is depicted in the flowchart of FIG. 7. After a frame image of a peeled shrimp sample is captured 30 and a digital image of each shrimp in the sample is created 32, a shrimp's volume is determined and the number of tail segments of the shrimp is counted 80. The shrimp is then classified 36 according to pre-established classification criteria. If the shrimp is classified as a bit 82, the next shrimp in the frame is analyzed in the same way. If the shrimp is not a bit and is classified into one of the quality levels, its weight is estimated 84 from its volume and meat density, as described previously. The number of intact tail segments of the shrimp is used to determine what percentage of its full weight is present 86 by reference to the %-weight versus number-of-segments curve as in FIG. 4. The algorithm uses the %-weight value to estimate the full-segment or six-segment weight 88 of the shrimp as though all its tail segments S1-T were intact. The computed weight of the imaged shrimp is divided by the %-weight value from the curve to compute the six-segment weight. Multiple cameras can be used to create a three-dimensional image and a more direct measurement of volume to be used to determine weight.

Figure 4:
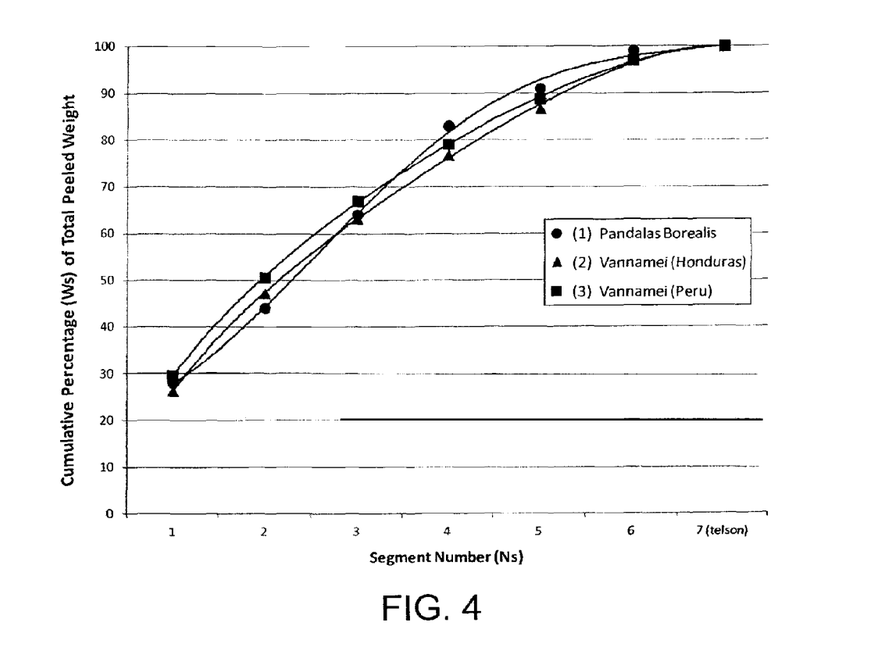
FIG. 4 is a graph showing the relationship between the cumulative percentage of a peeled shrimp's total weight and the number of intact contiguous tail segments.

Alternatively, the estimated shrimp's size (volume, shape, or both) may be used to estimate its percentage of full weight directly, without reference to the number of tail segments, by using an empirically predetermined relationship between size and percentage of full weight analogous to the relationship between number of tail segments and percentage of full weight shown in FIG. 4. The classification of the shrimps can be done by defining each class by a range of percentage of full weight: e.g., High Quality: >98%; Medium Quality: 92%-98%; Low Quality: 85%-92%; bits: <85%.

Some of the missing segments exit the process upstream of the camera position. For example, some of the missing segments are pulled through the peeler rollers and discarded. But other of the segments missing from the shrimps are conveyed to the vision system and imaged. That's why those missing segments, or bits, if they are not going to be sold, are not counted in calculating yield or throughput. The calculated weight of each non-bit shrimp piece is added to the accumulated weights for its class 90. The six-segment weights are summed 92 as well to compute a running six-segment total weight; i.e., what the accumulated weight of the peeled shrimp in the sample would be if all the shrimp had their six segments intact. The yield is computed 94 for each class by dividing the accumulated weights for each class by the accumulated six-segment weight of the sample. The throughput of the sample of peeled shrimp by class and overall is derived 96 by dividing the accumulated weights for each class and the six-segment weight by the time interval represented by the sample. The yield and throughput computations do not have to be performed at the same rate as the weight-summing, which is performed as each shrimp is analyzed. For example, the yield and throughput calculations could be performed only once per frame and could be filtered with previous values as described with reference to FIG. 6.

Thus, the vision system just described is based on estimated shrimp weights rather than on shrimp counts. The vision system identifies which segments are missing from individual shrimps to determine the quality level of each shrimp (from its number of intact segments). Then one or more segment-weight algorithms (using empirically determined curves as in FIG. 4) and density algorithms are used to compute each peeled shrimp's percentage and absolute loss in weight due to its missing segments. From that information, the %-yields and throughputs for each quality level and overall is computed.

The accuracy of the weight-based methods can be improved by the addition of an in-line, real-time weight measurement provided by a weighing device 28 (FIG. 3), such as a hopper weigh scale or a dynamic weigh belt. The weighing device sends a weight measurement to the processor 24 over a signal line 29. The weight measurement is used to refine the accuracy of the computed throughput values, which also improves the accuracy of the %-yield values.

Figure 5:
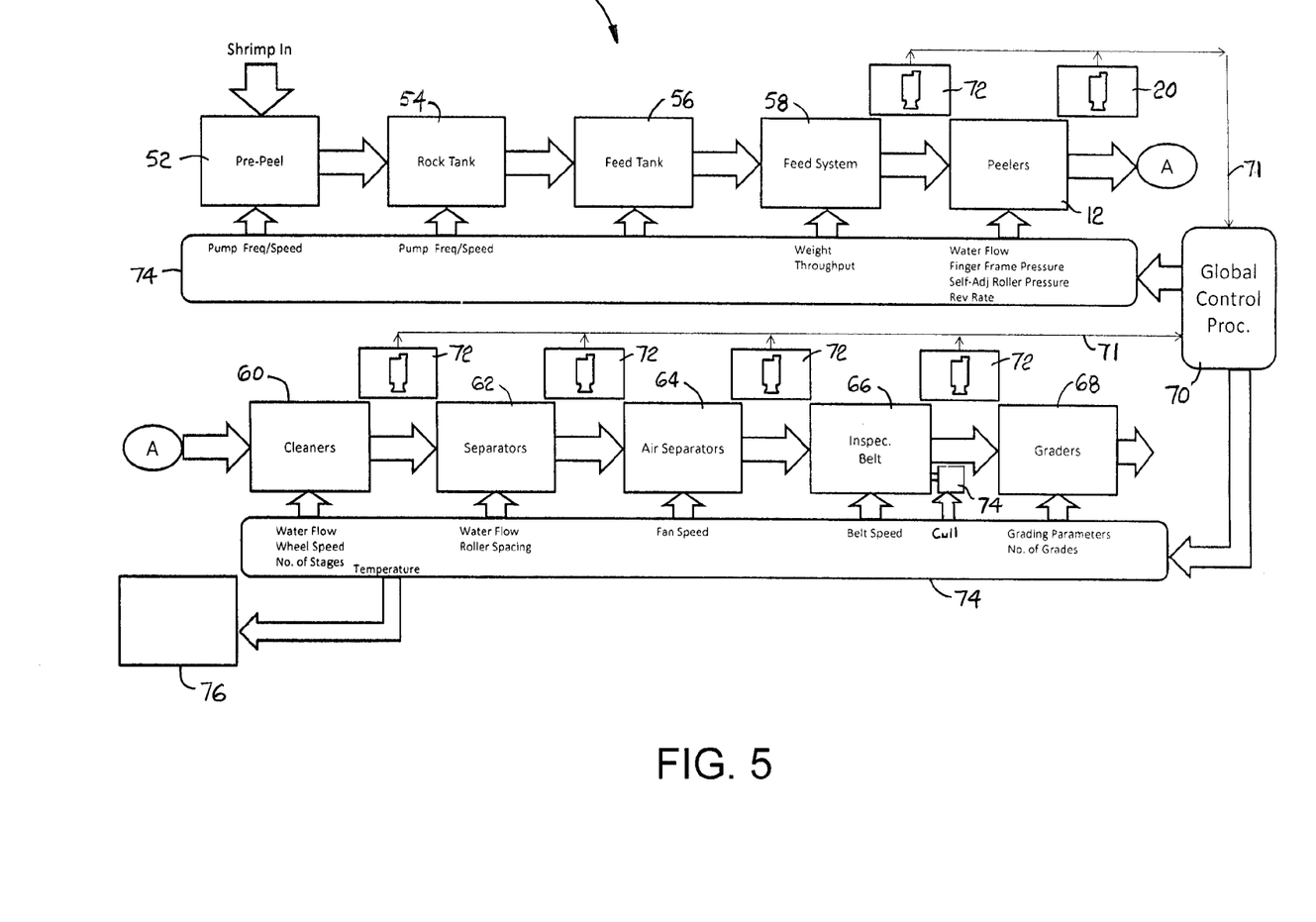
FIG. 5 is a block diagram of an automated shrimp-processing system embodying features of the invention.

The vision system with its tail-segment-counting, throughput, yield, and other algorithms can be integrated into a larger automated shrimp-processing system as shown in FIG. 5. The exemplary shrimp-processing system 50 includes one or more peelers 12 and associated vision systems 20 imaging peeled shrimp as previously described. Shell-on shrimp are drawn into the system by a pump or conveyor 52 and delivered to a rock-tank system 54, in which rock, shell, and other debris are removed from the shrimp by turbulent water flow in a rock tank. The shrimp separated from the debris are collected in the rock-tank system's receiving tank and pumped to a feed tank 56. The shrimp are conveyed from the feed tank by an automated feed system 58 that distributes the shrimp to the peelers 12. The peeled shrimp are conveyed from the peelers to one or more cleaners 60, which detach any residual shell and waste material. The shrimp are then conveyed to one or more roller separators 62 that separate the waste material detached by the cleaners 60 from the shrimp. Air separators 64 separate loosened waste material and shell from the shrimp. The shrimp are then conveyed on an inspection belt 66 where the shrimp can be inspected before being graded into different sizes in one or more graders 68. The graded shrimps can then be conveyed to deveiners (not shown) that slit the backs of the shrimps and remove the veins.

A global control processor 70 is used to monitor and control the entire shrimp-processing system 50. The global control processor can be realized as a single central processor or a network of distributed processors. The global control processor receives image data over input lines 71 from the peeler-output vision systems 20 and other vision systems 72 positioned at various points along the shrimp's process path through the system. The processor 70 can receive sensor signals from other sensors measuring other system variables, such as temperatures, weights, and speeds. For example, shrimp entering the peeler 12 can be imaged to determine if the throughput is too high. The output of the cleaners 60 can be monitored to determine the quality of the cleaning process. Likewise, the qualities of the roller-separation and air-separation processes can be determined by monitoring the outputs of the roller separators 62 and the air separators 64. The inspection belts 66 can be monitored to check on the infeed rate of shrimp to the graders 68. Besides the Model A peeler, Laitram Machinery, Inc. manufactures and sells other shrimp-processing equipment, such as the Laitram® Automated Fee System, the Model RTFS Rock Tank and Feed System, the Model C Cleaner, the Model S Roller Separator, the Model AS Air Separator, the Model IB Inspections Belt, and the Model G-8 Grader. Equipment such as the Laitram Machinery equipment mentioned is outfitted with actuators that can adjust various operational parameters of the equipment in response to control signals. The processing-equipment stations downstream of the peeler are linked by a conveyor system that may include conveyor belts, elevators, fluid conduits, or other transport apparatus transporting shrimps along the process path. The global control processor 70 runs algorithms and routines that develop shrimp images from the vision data and compute throughput, quality, and yield results at various points in the shrimp-processing system. The results can be displayed and used to derive control signals to automatically control the operation of the system over processor control output lines 74 to improve quality and yield. For example, the processor 70 can control the rate of delivery of shrimp to the rock tank 54 by controlling the speed of the input pump 52 or conveyor. The processor can also control the rate of delivery of shrimp from the rock-tank system's receiving tank to the feed tank 56 by controlling the speed of the receiving tank's pump. Both of these adjustments may depend on the volume of shrimp in the feed system 58 being distributed to the peelers 12. The volume of shrimp or their feed rate, or throughput, is determined from the vision system or from weigh scales. If the throughput is too high, the infeed pumps can be slowed and the speed of conveyor belts in the feed system can be slowed. If the throughput is too low, it can be increased by increasing the speeds of the pumps and the conveyor belts. Like the processor 24 in FIG. 3, the global control processor 70 can control the water flow, the finger-frame pressure, the roller pressure, or the roller-revolution rate based on the peeling quality, throughput, and yield measures. The water flow or wheel speed of the cleaners 60 can be adjusted based on the quality of the cleaning process. The water flow or the roller spacing of the roller separators 62, the fan speeds of the air separators 64, the speeds of the inspection belts 66, and the grade settings of the graders 68 can all be adjusted automatically as a function of the quality, yield, and throughput values computed from the vision or other measurements made throughout the system. And the global control processor 70 can monitor and control other system components, such as a waste water management system 76 and the temperature of the water. Or the processor can control a robotic culling system 78 at the inspection belt 66, for example, to segregate, unwanted shrimp bits and unidentifiable items from desirable shrimp product or to grade the shrimp instead of relying on a separate grader 68.

Figure 8:
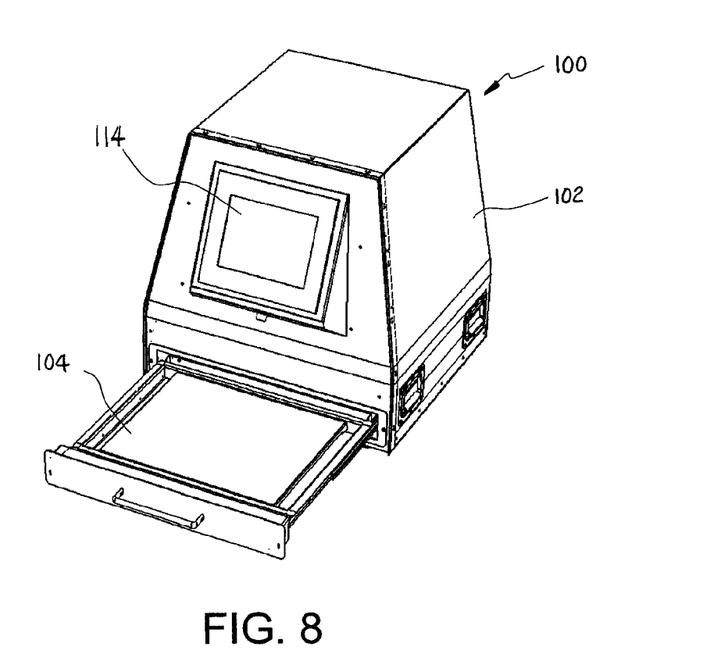
FIG. 8 is an isometric view of an off-line vision station usable in a shrimp-processing system as in FIG. 5.
Figure 9:
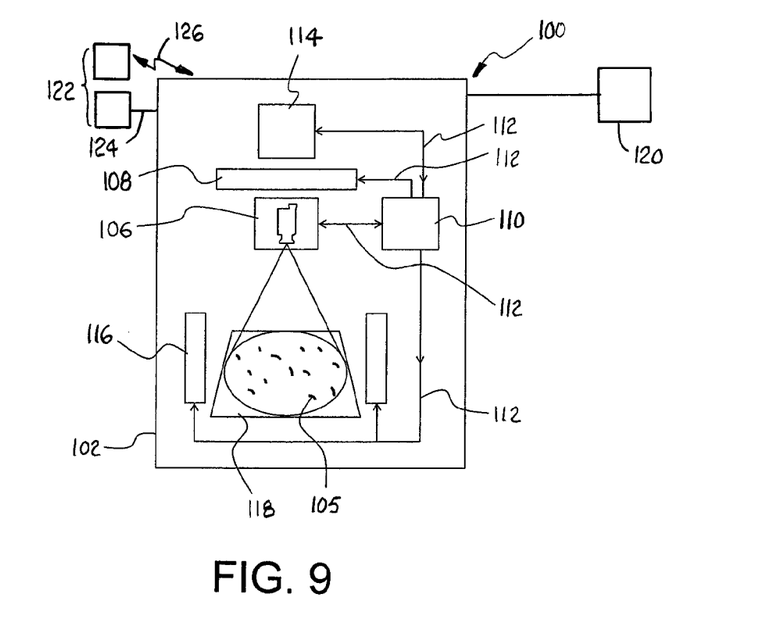
FIG. 9 is a block diagram of the off-line vision station of FIG. 8.

Any of the in-line vision systems 20, 72 of FIG. 5 can be replaced by an off-line quality-control (QC) station 100 with a visioning system as shown in FIGS. 8 and 9. Visioning off line, i.e., not in the conveying line, reduces the computing power required because fewer images need to be captured and processed in a given time period. The off-line QC vision station 100 consists of an enclosure 102 with a retractable tray 104 for loading and removing shrimps 105 to be imaged. The enclosure also houses one or more cameras 106, visible white lighting 108, and a processor or computer 110 that controls the camera or cameras 106 and the lighting 108 over control lines 112. The computer 110 interacts with a user interface 114, such as a flat-panel, touch screen, and processes the captured images. The vision system can also include ultraviolet (UV) lights 116 that aid in the detection of residual shell on the shrimps. Light in the UVC band (~254 nanometer wavelength) causes the chitin in shrimp shells to fluoresce so that, when the visible white lights 108 are turned off and the UV lights 116 turned on, florescent blue light emanating solely from shell-covered regions of the shrimps enable the camera or cameras 106 to detect any residual shell by using color-intensity analysis. By aligning the UV-illuminated image with the white-light-illuminated image of each shrimp, the color-intensity analysis is confined to the shrimp image, which eliminates errors that background conveyor material or other non-shrimp fluorescing objects can cause.

When an off-line QC vision station is used, a human operator or a robot collects a sample of one or more shrimps from the shrimp-processing system 50 (FIG. 5) and deposits the sample of shrimps side down on the support surface 118 of the off-line vision system's tray 104. For better visioning the shrimps are not piggy-backed. The tray is pushed into the enclosure, and the sample shrimp or shrimps are imaged. In this way various characteristics of shrimps entering, being processed by, or exiting the shrimp-processing system 50 are measured by one or more cameras 106 to optically detect features and measure dimensional and geometric attributes of individual shrimps; e.g., the number of intact segments, the percentage of full size. Other features that can be discerned from the images include black spot (melanosis), necrosis, and spoilage detectable as color variations from a standard range. From those measured attributes, the quality and weight of each of the sampled and imaged shrimps is approximated. From the approximated values for each of the individual sampled shrimps, the computer 110 estimates the aggregate quality, weight, and yield of the continuous product stream. Similarly, the aggregate quality, weight, and yield values for individual samples of shrimps can be combined with the aggregate results of other samples to improve the estimates. The results for the samples can be displayed on the screen and stored to provide an intermittent but ongoing record of process performance that can be used to adjust the process for continuous improvement. The off-line QC station 100 is optionally connected to the Internet directly or through a server 120 for World Wide Web access by users remote from the station. Remote users have QC-station-specific, password-protected access to a web portal displaying historical data in tabular or chart form for any time period. From the analysis of data from a single user or from multiple participating users, benchmarks can be derived for comparison with actual results.

The off-line QC vision station 100 could also include other off-line sensors 122 whose data would supplement the vision data and be accessible via local or remote display. Or the other sensors could be remote from the vision station 100 and networked with the station by wire 124 or wirelessly 126. Examples of other sensors are: (a) penetrometer or texturometer to measure texture, firmness, or soft shell by measuring the force of penetration of the shrimp; (b) infra-red spectrometer to measure moisture content, dehydration, or excessive glazing; and (c) chemosensor or gas chromatograph to measure shrimp smell. Moisture content and dehydration can alternatively be measured at the QC station 100 with a weigh-dry-weigh system including a dryer and a weight sensor that compares the weights of a shrimp or shrimps before and after drying for a specified time. Some of the quality features can instead be observed by a human operator and manually inputted via the user interface 114. Examples are: (a) smell; (b) spoilage; (c) black spot; (d) necrosis; (e) soft shell; (f) texture; (g) firmness; (h) dehydration; (i) glazing; and (j) unacceptable residual vein or improper vein cut after deveining.

Although both the on-line and off-line vision stations were described as creating images of peeled, headless shrimp, they could also be used to create images of headless, shell-on or head-on, shell-on shrimp, which would then be subjected to a similar quality analysis.

What is claimed is:

1. A shrimp-processing system comprising:
   a conveyor conveying shrimps along a processing line;
   an off-line QC station having a vision system capturing digital images of sample shrimps collected from the shrimps on the conveyor;
   a processor determining the number of tail segments present in each of the sample shrimps or estimating the percentage of full weight of each of the sample shrimps from the digital image and classifying each of the sample shrimps into one of a plurality of classes according to the number of tail segments present in or the percentage of full weight of each of the sample shrimps.

2. A shrimp-processing system as in claim 1 further comprising a shrimp peeling machine removing the heads and shells from the shrimps to produce peeled shrimps from which the sample shrimps are collected.

3. A shrimp-processing system as in claim 1 wherein the off-line QC station further includes a web portal providing remote access.

4. A shrimp-processing system as in claim 1 wherein the off-line QC station further includes one or more sensors detecting one or more operational variables of the processing line or one or more physical characteristics of the sample shrimps and producing sensor signals indicative of the one or more operational variables or physical characteristics.

5. A shrimp-processing system as in claim 4 wherein the one or more sensors include a penetrometer or a texturometer to measure texture, firmness, or soft shell by measuring the force of penetration of the shrimp.

6. A shrimp-processing system as in claim 4 wherein the one or more sensors include an infrared spectrometer to measure moisture content, dehydration, or excessive glazing.

7. A shrimp-processing system as in claim 4 wherein the one or more sensors include a chemosensor or a gas chromatograph to measure shrimp smell.

8. A shrimp-processing system as in claim 4 further including a dryer for drying the sample shrimps and wherein the one or more sensors include a weight sensor that weighs the sample shrimps before and after drying in the dryer.

9. A shrimp-processing system as in claim 4 wherein the one or more sensors are remote from vision system and connected wirelessly or by wire to the off-line QC station.

10. A shrimp-processing system as in claim 1 wherein the vision system includes a source of white light and a source of ultraviolet light and wherein the off-line vision station creates a first digital image of each of the sample shrimps illuminated by white light and a second digital image of each of the sample shrimps illuminated by ultraviolet light.

11. An off-line QC station for a shrimp-processing line, comprising:
a vision system capturing a digital image of sample shrimps collected from the shrimps on the conveyor;
a processor determining the number of tail segments present in each of the sample shrimps or estimating the percentage of full weight of each of the sample shrimps from the digital image and classifying each of the sample shrimps into one of a plurality of classes according to the number of tail segments present in or the percentage of full weight of each of the sample shrimps.

12. An off-line QC station as in claim 11 wherein the off-line QC station further includes a web portal providing remote access.

13. An off-line QC station as in claim 11 wherein the off-line QC station further includes one or more sensors detecting one or more operational variables of the processing line or one or more physical characteristics of the shrimps and producing sensor signals indicative of the one or more operational variables or physical characteristics.

14. An off-line QC station as in claim 13 wherein the one or more sensors include a penetrometer or a texturometer to measure texture, firmness, or soft shell by measuring the force of penetration of the shrimp.

15. An off-line QC station as in claim 13 wherein the one or more sensors include an infrared spectrometer to measure moisture content, dehydration, or excessive glazing.

16. An off-line QC station as in claim 13 wherein the one or more sensors include a chemosensor or a gas chromatograph to measure shrimp smell.

17. An off-line QC station as in claim 13 further including a dryer for drying the sample shrimps and wherein the one or more sensors include a weight sensor that weighs the sample shrimps before and after drying in the dryer.

18. An off-line QC station as in claim 13 wherein the one or more sensors are remote from vision system and connected wirelessly or by wire to the off-line QC station.

19. An off-line QC station as in claim 11 wherein the vision system includes a source of white light and a source of ultraviolet light and wherein the vision system creates a first digital image of each of the sample shrimps illuminated by white light and a second digital image of each of the sample shrimps illuminated by ultraviolet light.

20. A method for processing shrimps, comprising:
transporting shrimps on a conveyor in a conveying direction on a processing line;
collecting sample shrimps from the shrimps being transported on the conveyor;
creating a digital image of the shrimps in an off-line vision station;
determining the number of tail segments in or the percentage of full weight of each of the sample shrimps from the digital image;
classifying each of the sample shrimps into one of a plurality of classes according to the number of tail segments present in or the percentage of full weight of each of the shrimps.

21. The method of claim 20 further comprising depositing the sample shrimps onto a support surface so that no shrimp are piggy-backed.

22. The method of claim 20 further comprising detecting one or more operational variables of the processing line or one or more physical characteristics of the shrimps and producing sensor signals indicative of the one or more operational variables or physical characteristics.

23. The method of claim 22 wherein the one or more physical characteristics are one or more of smell, spoilage, black spot, necrosis, soft shell, texture, firmness, dehydration, glazing, unacceptable residual vein, and improperly cut vein.

24. The method of claim 20 comprising creating digital images of each of the shrimps under both white light and ultraviolet light and comparing those images to detect residual shell.

25. The method of claim 20 further comprising weighing the sample shrimps, drying the sample shrimps, weighing the sample shrimps after drying, and comparing the weights before and after drying to determine moisture content of the shrimps.

* * * * *